Dec. 13, 1955              J. J. JONES              2,727,207
DEVICE FOR MEASURING MAGNETIC FIELD
INTENSITY AND POLE DIRECTION

Filed Sept. 19, 1952              2 Sheets—Sheet 1

INVENTOR.
JOHN J. JONES
BY
ATTORNEYS

Dec. 13, 1955   J. J. JONES   2,727,207
DEVICE FOR MEASURING MAGNETIC FIELD
INTENSITY AND POLE DIRECTION
Filed Sept. 19, 1952   2 Sheets-Sheet 2
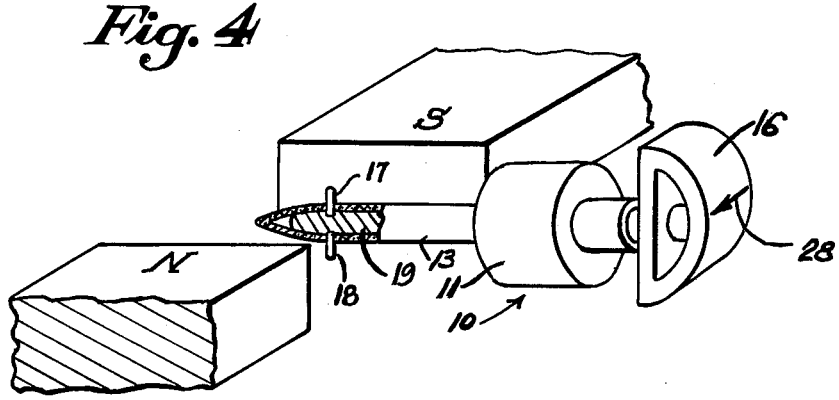
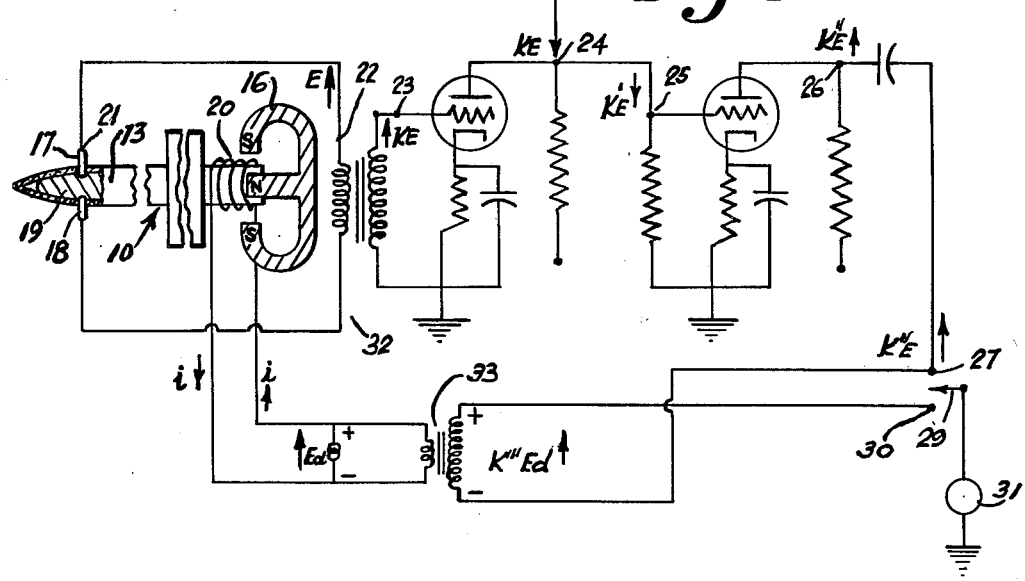
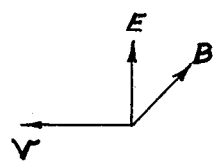
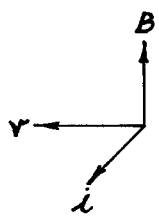
INVENTOR.
JOHN J. JONES
BY Richard y Geier
ATTORNEYS United States Patent Office 2,727,207
Patented Dec. 13, 1955

2,727,207

DEVICE FOR MEASURING MAGNETIC FIELD INTENSITY AND POLE DIRECTION

John J. Jones, Boonton, N. J.

Application September 19, 1952, Serial No. 310,465

2 Claims. (Cl. 324—47)

This invention relates to a device for measuring the intensity and direction of magnetic fields.

In the past, calibrated ballistic galvanometers and rotating coils have been used to measure the intensity of magnetic fields. Devices dependent upon the hysteresis effects in ferro-magnetic materials when subjected to magnetic stress have also been used. However, problems dealing with hysteresis are essentially problems in non-linear circuits, and as such complicate the measuring process since special innovations are usually necessary to observe the effects of non-linearity.

It is an object of the instant invention to provide a device which can measure the value of either continuous direct or alternating current magnetic fields.

An additional object is to provide a device that has the advantage, compared with the ballistic galvanometer, of being able to give continuous indications of field strength and direction.

A further object is to provide a device that, compared with the rotating coil, is of higher sensitivity and susceptible of better mechanical construction.

Another object is to provide an essentially simple, linear magneto-electric device, the output of which is directly proportional to the strength of the field being measured.

It is also an object of the instant invention to provide a relatvely small device, compared with known similar devices, in order to facilitate transportation and operation.

Other objects of the instant invention will become apparent in the course of the following specification.

In the attainment of the aforesaid objectives, the device is constituted of a hollow metal cylinder with a vibrating diaphragm over one end and one end of a narrow non-electrically conductive tube connected to the opposite end, the interior of the tube communicating with the interior of the cylinder. The free end of the tube is closed and mercury is inserted in the closed system, the mercury completely filling the cylinder and either completely or partially filling the tube. Inserted through the tube adjacent the free end thereof are two electrodes in opposed relationship, the electrodes protruding into the mercury sufficiently to make contact therewith. The diaphragm is caused to vibrate by applying an A.-C. voltage of any desired magnitude and frequency to a coil affixed to the outer surface thereof with the coil located in the field of a permanent magnet. Since the voltage obtained from the device will be minute, amplification is necessary before metering and a known low noise level, high gain amplifier circuit with low impedance input is used for the amplification. However, to determine the location of a particular pole a new and novel circuit is employed.

The invention will appear more clearly from the following detailed description when taken in conjunction with the accompanying drawings showing by way of example the preferred embodiment of the inventive concept.

In the drawings:

Figure 4 is a perspective view of the device shown in Figure 1 inserted in a simplified magnetic field;

Figure 5 is a vector diagram of the electrical behavior of the electrodes of the device shown in Figure 4 at one moment;

Figure 6 is a diagrammatic view of the circuits used with the device of Figure 1 for determining both the intensity of the magnetic field and the location of a particular pole; and Figure 7 is similar to Figure 5 but showing the electrical behavior of the coil of the device shown in Figure 4 at one moment.

Figure 1:
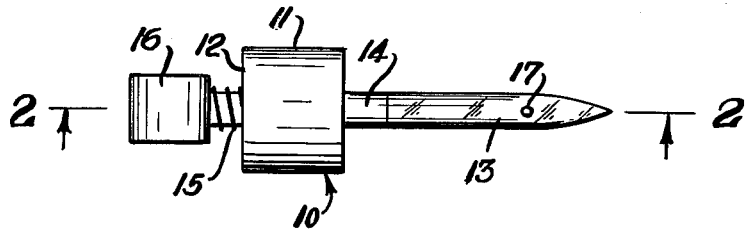
Figure 1 is a plan view of the device constructed in accordance with the principles of this invention.

Referring now in greater detail to the drawings where like reference numerals indicate like parts reference numeral 10 indicates the device.

The device 10 is constituted in part of a metallic receptacle 11, a diaphragm 12, and an electrically non-conductive tube 13.

The receptacle 11 is open at one end and at the opposite end has an integrally formed or otherwise attached tubular protrusion 14 which communicates with the interior of the receptacle.

The diaphragm 12, formed of thin metal, is attached in a known manner over the open end of the receptacle. An A.-C. coil 15, situated between the poles of a permanent magnet 16 is attached in the conventional manner to the diaphragm.

Figure 2:
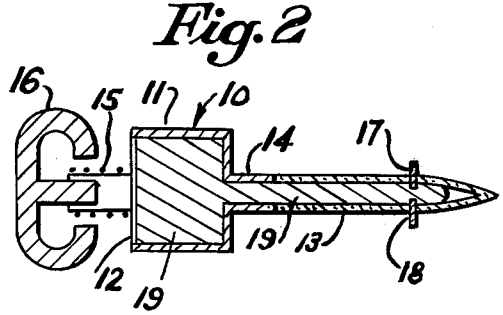
Figure 2 is a sectional view along 2—2 of Figure 1.
Figure 3:
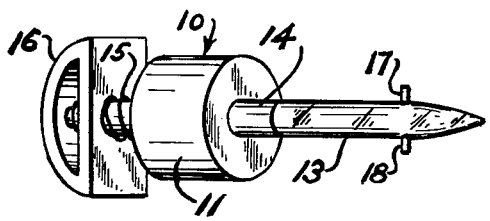
Figure 3 is a perspective view of the device shown in Figure 1.

One end of the electrically non-conductive tube 13, made of glass or other like material, is attached by conventional copper-to-glass seals or the like to the free end of the protrusion 14 while the free end of the glass tube is closed. Sealed in the tube 13 are the electrodes 17 and 18 in opposed relationship, preferably with the center lines of the electrodes and the tube at 90°. A fluid 19 (Fig. 2) in contact with the opposed ends of the electrodes is inserted in the assembled receptacle and glass tube. The fluid 19 may be mercury or theoretically any other electrically conductive or non-conductive substance.

In operation:

When measuring the intensity of a magnetic field, the terminals or leads of the A.-C. coil (Fig. 6) are connected to an A.-C. source and the device inserted into the magnetic field, the intensity of which is to be measured (Fig. 4). The coaction of the magnetic fields of the A.-C. coil 15 and the permanent magnet 16 will cause the diaphragm 12 to vibrate and in turn the fluid 19. The maximum voltage induced in the electrodes 17 and 18 will be obtained when the electrodes are at 90° to the flux lines. If the direction of the magnetic field be unknown, the device can be rotated until the maximum reading is obtained on the later described meter 31.

The electrical behavior of the device (Fig. 4) is shown by the vector diagram in Figure 5 where V represents the instantaneous velocity of the fluid, B the flux density of the unknown field, and E the voltage induced across any elemental section of the fluid in the magnetic field. Directly under the electrodes the element of the fluid has a forward velocity V due to the excitation of the diaphragm 12. Thus, there will appear at the electrodes a voltage E given by the equation $E=Blv$ where E is in volts, B the field strength in webers per square meter, $l$ is the length of the conductor, that is, the inside diameter of the tube in meters, $v$ is the fluid velocity in meters per second.

If sinusoidal excitation of the diaphragm and undistorted transmission through the mercury be assumed, it will be apparent that a sinusoidal voltage will appear at the electrodes, the electrode 17 being, with respect to the electrode 18, positive as the fluid moves forward and negative as it moves backward.

The voltage obtained from the device will naturally be small so that amplification will be necessary before metering. Thus, the output voltage of the electrodes 17 and 18 can be connected through a known low noise level, high gain amplifier with low impedance input to the meter 31 (Fig. 6). The entire assembly may be calibrated against known fields so that the meter scale will read directly in gauses, lines per square inch, or any other convenient unit.

As thus far described and illustrated, subject device will measure the strength of any magnetic field and indicate the direction of the lines of flux at 90° to the electrodes at maximum indication. However, there is a need for determining the actual direction of a particular pole, that is, north or south, which is explained in the following paragraph.

When determining the direction of a particular pole, the electrodes 17 and 18 in the liquid 19 are inserted in the unknown magnetic field with the permanent magnet 16 and coil 15 substantially as shown in Figure 6 where the coil 15 is wound as indicated and with E$d$ representing the driving voltage applied to the coil 15. The vector diagram illustrating the electrical condition at the point 20 (Fig. 6) will be as shown in Figure 7, that is the field direction B is upward, from north to south, the current $i$ is out of the paper toward the observer and the motion of the coil and diaphragm is to the left as viewed in Figure 6, that is forward motion as opposed to backward motion.

At the point 21 of the circuit (Fig. 6), the electrode 17, the vector diagram is as shown in Figure 5, that is the field B is into the paper or away from the observer, the velocity of the fluid imparted by the diaphragm is forward and the vector direction of the induced voltage of the electrodes is upward. Thus, when the device is inserted into a magnetic field (Fig. 4) where the north pole is at the left of an observer standing at the coil end of the device, a voltage is obtained at the electrodes which is in phase with the driving voltage of the A.C. coil 15, assuming that the impedance of the coil is practically resistive. In practice, it is fairly simple to obtain a largely resistive coil impedance, especially at the lower frequencies. It should also be remembered that the motional impedance of the coil will contain a large reflected resistive component due to the work done on the mercury column provided resonant lengths of mercury are avoided.

The voltages at points 22 and 23 of the circuit, on opposite sides of the transformer 32, are as indicated in Figure 6, $k$ indicating any voltage gain in the transformer. Assuming mid-band operation of the amplifier, the gain of the first stage will be $$\frac{-uR_L}{r_p+R_L}$$

producing an amplified voltage at point 24 of $$\left(\frac{-uR_L}{r_p+R_L}\right)kE$$

or simply $k'E$. As indicated by the minus sign, the voltage is shifted in phase 180° and is transmitted to point 25, the grid of the next stage, consequently producing at point 26 a voltage of $$\left(\frac{-uR_L}{r_p+R_L}\right)^2 kE$$

or simply $k''E$. Due to the second 180° phase reversal, the last mentioned voltage is in phase with the voltage at the point 22. Of course, such phase relationships will hold true for any even number of stages. Otherwise expressed, in an amplifier with an even number of stages there will appear at the output point 27 an amplified voltage which is in phase with the driving voltage E$d$ applied to the coil 15. Observing the circuit of the meter 31, it will be seen that the meter is across two voltages in series, namely the output voltage $k''E$ of the amplifier and $k'''E d$ a stepped-up voltage, through the transformer 33, in phase with the voltage E$d$ of the coil 15. Hence, the reading of the meter 31 will be a maximum, the sum of both voltages when the switch 29 is in operable engagement with the point 30. If, however, the device 10 were rotated 180° so that the arrow 28 (Fig. 4) points into the paper, it will be apparent that the phase of the voltage across the electrodes 17 and 18 will be reversed 180° with respect to the voltage of the coil 15, that is when the voltage of the coil 15 is positive and driving the fluid forward, the voltage of the electrode 17 will be negative, it now being reversed from the position shown in Figure 4. Under such conditions, the meter reading will be the difference of the two voltages. Thus, the circuit provides a simple way of determining the direction of a particular pole. When the switch 29 is thrown to the direction position 30 and the device rotated, maximum meter deflection indicates the arrow 28 (Fig. 4) is pointing toward the north magnetic pole while minimum deflection means that the arrow is pointing toward the south pole. During normal intensity measurements, the switch 29 is thrown to the intensity measurements position 27 which removes the voltage $k'''Ed$ from the meter and connects the meter directly to the output of the known amplifier circuit.

In the measurement of the intensity of alternating magnetic fields where the direction of the field is constantly changing, the term direction has meaning only when instantaneous values are considered. If the fluid 19 is vibrating in a field the value of which is changing sinusoidally, the magnitude of the envelope of the output voltage will also vary sinusoidally, much as a modulated wave. If the vibrating frequency of the device 10 is below the frequency of the flux, the output will be a modulated wave the carrier frequency of which, to continue the analogy, is the flux frequency, and the envelope or modulation frequency of which is twice the vibrational frequency of the device. If the flux frequency is below the frequency of the device, the output will be a modulated wave the carrier frequency of which is the vibrational frequency of the device and the envelope or modulation frequency of which is twice the flux frequency. In either case, the peak value of the envelope will be proportional to the product of the maximum fluid velocity and the maximum field strength. The peak value can readily be measured and is a direct indication of the peak value of the unknown field, the measurement being made by the known circuit consisting of a diode, a resistor, and a capacitor used to indicate the peak value of the modulated wave. Thus subject device 10 can be used with the known circuit in the measurement of alternating magnetic fields. Obviously, there may be many variations of the conventional peak indicating detector circuit. By adjusting the time constant of the circuit, and by varying the resistor and/or the capacitor the output can be made to follow only the peak values or it can be made to follow the entire envelope. Where oscillographic presentation is desired, as for fields not possessing half-wave symmetry, it would be necessary to have the detector output follow the entire wave form. Obviously, the latter method can only be used when the flux frequency is below the frequency of the device 10 since it is only then the envelope wave form represents the flux wave form with, of course, the negative half of the flux cycle inverted.

While there is above described only one embodiment of the device and novel metering circuit, it is possible to produce still other embodiments without departing from the inventive concept herein disclosed, and it is desired therefore, that only such limitations be imposed on the appended claims as are stated therein.

What is claimed is:

1. A device for measuring magnetic field intensity, the device comprising a metallic cylinder adapted to be filled with a conducting fluid, the cylinder being open at one end and closed at the opposite end, the closed end of the cylinder having a tubular protrusion integrally formed therewith and communicating with the interior of the hollow cylinder, a glass tube disposed on the free end of the tubular protrusion, the free end of the glass tube being closed, a diaphragm disposed over the open end of the cylinder for vibrating said liquid, electrodes in said glass tube, an A.-C. coil disposed on the outer surface of the diaphragm, a permanent magnet coacting with the A.-C. coil, an electrical power source for the A.-C. coil, an amplifying circuit for the output of the electrodes, a meter for the output of the amplifying circuit, and means for calibrating the meter.

2. A device for measuring magnetic field intensity and for finding the direction of a magnetic pole, the device comprising a receptacle open at one end and closed at the opposite end, a diaphragm disposed over the open end of the receptacle, an A.-C. coil for the diaphragm, a permanent magnet coacting with the A.-C. coil, two electrodes disposed in the receptacle in opposed relationship, the electrodes being electrically insulated from each other, a conducting liquid disposed in the receptacle, the opposed ends of the electrodes extending into the liquid, a circuit for the A.-C. coil, a transformer and an A.-C. electrical power source for the circuit, a second circuit for the electrodes, a second transformer for the second mentioned circuit, an amplifying circuit for the second mentioned transformer, the amplifying circuit having an even number of stages, and a metering circuit for the output of the amplifying circuit coacting with the first mentioned transformer.

References Cited in the file of this patent
UNITED STATES PATENTS

| | | |
|---|---|---|
| 2,418,553 | Irwin | Apr. 8, 1947 |
| 2,490,009 | Thomas | Nov. 29, 1949 |
| 2,517,975 | Chapin | Aug. 8, 1950 |

OTHER REFERENCES

The Review of Scientific Instruments, vol. 16, No. 8, August 1945, pages 209–214. Article by Kolin.